No. 693,279. Patented Feb. 11, 1902.
S. L. LAMOREUX.
FEEDING RACK.
(Application filed Oct. 3, 1901.)
(No Model.)
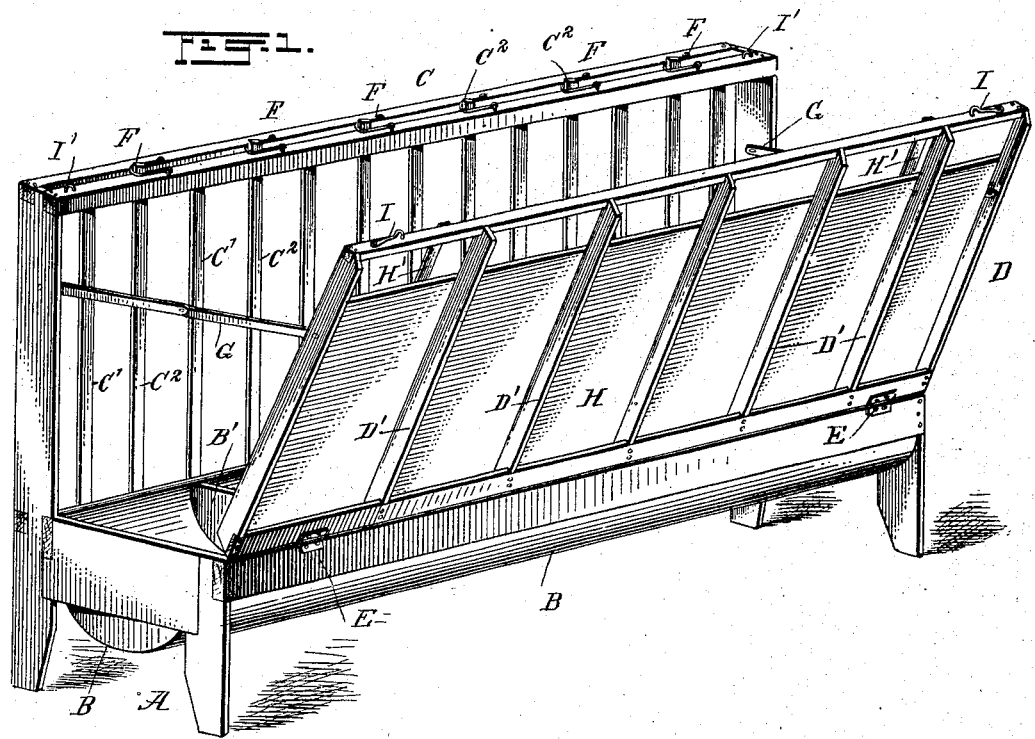
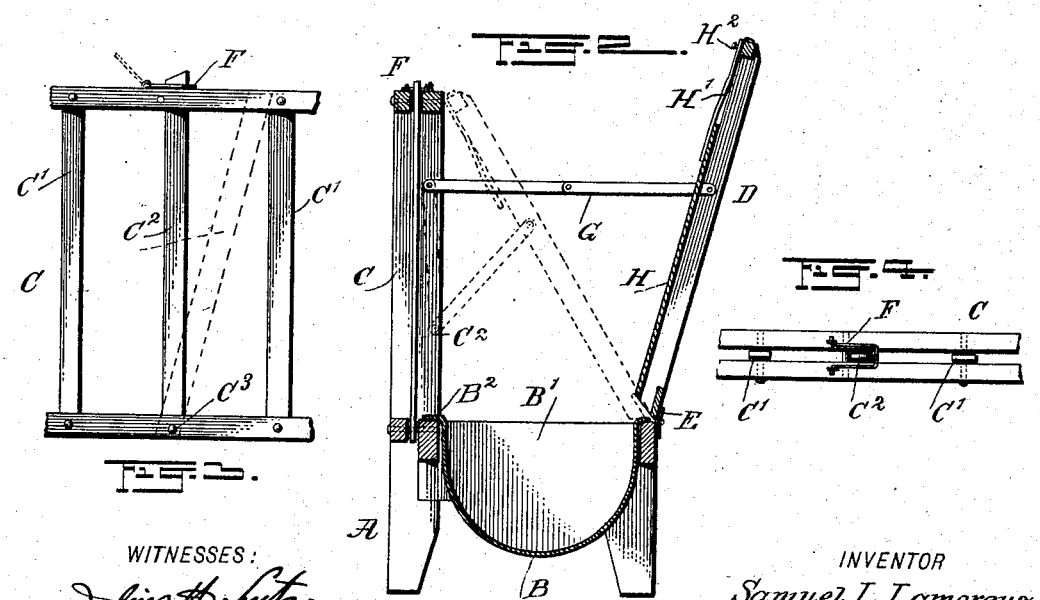
WITNESSES:
INVENTOR
Samuel L. Lamoreux
BY
ATTORNEYS

UNITED STATES PATENT OFFICE.

SAMUEL LANE LAMOREUX, OF TITONKA, IOWA.

FEEDING-RACK.

SPECIFICATION forming part of Letters Patent No. 693,279, dated February 11, 1902.

Application filed October 3, 1901. Serial No. 77,393. (No model.)

*To all whom it may concern:*

Be it known that I, SAMUEL LANE LAMOREUX, a citizen of the United States, and a resident of Titonka, in the county of Kossuth and State of Iowa, have invented a new and Improved Feeding-Rack, of which the following is a full, clear, and exact description.

The invention relates to improvements in the care of live stock; and its object is to provide a new and improved feeding-rack which is simple and durable in construction and arranged to permit of conveniently and quickly adjusting the several parts for feeding milk, grain, or hay to the calves and without danger of spilling the milk or grain.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1 is a perspective view of the improvement with the parts arranged for feeding hay. Fig. 2 is a transverse section of the same. Fig. 3 is a side elevation of the side of the rack through which the calves feed on the hay held in the rack, and Fig. 4 is a plan view of the same.

The improved feeding-rack consists, essentially, of a suitable stand A, removably supporting a trough B, having spaced transverse partitions B' to form separate feed-receptacles for containing milk or grain to be fed to the calves, as hereinafter more fully explained. From one side of the stand A extends rigidly a slat side C, through which the calves feed on hay placed in the rack, and on the other side of the said stand A is arranged a slat side D, connected by hinges E to the corresponding side of the stand A to allow of swinging the said side D either into an inclined outermost position, as shown in Figs. 1 and 2, when it is desired to feed hay to the calves through the side C, or to allow of swinging the said side D into an inclined innermost position, as shown in dotted lines in Fig. 2, whenever it is desired to feed milk or grain contained in the feed-receptacles of the trough B. The side C extends approximately vertically and is provided with fixed slats C', alternating with slats $C^2$, pivoted at their lower ends $C^3$ to the bottom rail of the side C, and the free upper end of each pivoted slat $C^2$ is adapted to be engaged by a suitable locking device F for locking the slat in place and extending parallel to the slat C'. When the locking device F is disengaged from the free end of the slat $C^2$, the latter can be swung sidewise into an inclined position, as shown in dotted lines in Fig. 3, to allow the heads of the calves to pass through the enlarged opening into the rack for conveniently feeding on the hay contained in the rack. The hinged side D is provided with fixed slats D', arranged in alinement with the transverse partitions B' of the trough B, so that when the side D is in an innermost inclined position, as indicated in dotted lines in Fig. 2, the calves passing their heads between the adjacent slats D' into a corresponding feed-receptacle in the trough are prevented from passing their heads into adjacent feed-receptacles. In order to hold the hinged side D in an outermost inclined position, as shown in Figs. 1 and 2, I provide sectional braces G, pivotally connected with the ends of the side D and with the ends of the side C. A back board H is removably held on the inner face of the side D when the latter is in an outermost inclined position, and this back board H is provided at its upper end with straps H', adapted to be hooked onto pins $H^2$, secured to the top rail of the side D.

When the device is used for feeding hay, the back board H is used so as to hold the hay properly in position between the sides C and D of the rack; but when it is desired to use the rack for feeding milk or grain, the board H is removed by unhooking the straps H' from the pins $H^2$. In order to lock the hinged side D in position when in an inclined innermost position, I provide locking devices consisting of hooks I, hinged on the top rail of the side D at the ends thereof, the said hooks being adapted to engage corresponding staples I' on the top rail of the fixed side C.

When it is desired to remove the feed-trough B from the stand A, it is necessary to disconnect the braces G from the hinged side D to allow of swinging the latter downward to permit the operator to lift the trough B out of the stand, it being understood that the said trough is preferably formed on its sides with outwardly-extending flanges B², (see Fig. 2,) normally seated on the side rails of the stand A. The device is very simple and durable in construction and can be readily manipulated to bring the several parts in the desired position for feeding milk, grain, or hay, according to the ages of the calves to be fed.

Having thus described my invention, I claim as new and desire to secure by Letters Patent—

1. The combination, in a feeding-rack, of a stand, a trough removably supported on the stand, a slatted side extending upwardly from the stand, and disposed in a plane at one side of the trough, and an adjustable side hinged in a plane on the opposite side of the trough, the space between the sides and above the trough being unobstructed.

2. A feeding-rack, comprising a stand, a trough therein, slat sides, of which one is fixed to the stand and the other is hinged thereto, and adapted to extend in either an inclined outward position or into an inclined inward position relative to the fixed side, and a folding brace between the sides to hold the hinged side in an extended outermost position, as set forth.

3. A feeding-rack, comprising a stand, a trough therein, slat sides, of which one is fixed to the stand and the other is hinged thereto, and adapted to extend in either an inclined outward position or into an inclined inward position relative to the fixed side, a folding brace between the sides to hold the hinged side in an extended outermost position, and a back board removably held on the said hinged side, as set forth.

4. A feeding-rack, comprising a stand, slat sides, of which one is fixed to the stand, and the other is hinged thereto and adapted to extend in either an inclined outward position or into an inclined inward position relative to the fixed side, a folding brace between the sides to hold the hinged side in an extended outermost position, and a trough removably held on the sides of the stand between the lower ends of the slat sides, as set forth.

5. A feeding-rack, comprising a stand, a feed-trough on the stand, and the slat sides, of which one is fixed on the stand and extends approximately in a vertical direction and the other side is hinged to the stand and is adapted to swing into an inwardly and upwardly inclined position relative to the fixed side, and a back portion supported removably on the adjustable slatted side, as set forth.

6. A feeding-rack, comprising a stand, a feed-trough supported removably on the stand, the slatted sides, of which one is fixed on the stand and extends approximately in a vertical direction and the other side is hinged to the stand and is adapted to swing into an inwardly and upwardly inclined position relative to the fixed side, and a back board for removable connection with the said hinged side at the inside thereof, as set forth.

7. A feeding-rack, comprising a stand, a feed-trough on the stand, and sides, of which one is fixed on the stand and extends approximately in a vertical direction and the other side is hinged to the stand and is adapted to swing into an inwardly and upwardly inclined position relative to the fixed side, the said trough having transverse partitions, and the hinged side having spaced slats in transverse alinement with the said partitions, as set forth.

8. A feeding-rack, comprising a stand, a trough thereon provided with transverse partitions, and sides, of which one is fixed and provided with adjustable slats, and the other extends upwardly and inwardly to rest with its upper end on the upper end of the fixed side, the said inclined side having spaced slats in alinement with transverse partitions in the said trough, as set forth.

In witness whereof I have signed my name to this specification in the presence of two witnesses.

SAMUEL LANE LAMOREUX.

Witnesses:
J. W. LAMOREUX,
T. W. HEIFNER.